United States Patent [19]

Bolin

[11] Patent Number: 4,750,929

[45] Date of Patent: Jun. 14, 1988

[54] COOLING SYSTEM FOR A GLASSWARE FORMING MACHINE

[75] Inventor: James A. Bolin, Tulsa, Okla.

[73] Assignee: Liberty Glass Company, Sapulpa, Okla.

[21] Appl. No.: 81,148

[22] Filed: Aug. 3, 1987

Related U.S. Application Data

[63] Continuation of Ser. No. 10,483, Feb. 3, 1987, abandoned, which is a continuation of Ser. No. 859,644, May 5, 1986, abandoned.

[51] Int. Cl.$^4$ .............................................. C03B 9/38
[52] U.S. Cl. .......................................... 65/265; 65/267; 65/319; 65/356
[58] Field of Search ................. 65/265, 267, 319, 356

[56] References Cited

U.S. PATENT DOCUMENTS

| | | | |
|---|---|---|---|
| 2,402,475 | 6/1946 | Waterbury et al. | 65/355 |
| 3,094,404 | 6/1963 | Lauck | 65/319 |
| 3,249,418 | 5/1966 | Irwin et al. | 65/356 |
| 3,499,746 | 3/1970 | Blankenship et al. | 65/265 |
| 3,586,491 | 6/1971 | Mennitt | 65/265 |
| 3,617,232 | 11/1971 | Goodwin | 65/267 |
| 3,653,870 | 4/1972 | Foster et al. | 65/356 |
| 3,849,101 | 11/1974 | Wythe et al. | 65/355 |
| 4,070,174 | 1/1978 | Nebelung et al. | 65/229 |
| 4,140,046 | 2/1979 | Marbach | 93/33 |
| 4,142,884 | 3/1979 | Jones, Jr. | 65/356 |
| 4,251,353 | 2/1981 | Becker et al. | 65/267 |
| 4,361,434 | 11/1982 | Schneider | 65/265 |
| 4,388,099 | 6/1983 | Hermening et al. | 65/267 |
| 4,490,164 | 12/1984 | Nebelung et al. | 65/267 X |
| 4,561,875 | 12/1985 | Foster | 65/267 |

FOREIGN PATENT DOCUMENTS

| | | |
|---|---|---|
| 26747/84 | 10/1984 | Australia . |
| 0125488 | 6/1986 | European Pat. Off. . |
| 3313934 | 4/1984 | Fed. Rep. of Germany . |

*Primary Examiner*—Arthur Kellogg
*Attorney, Agent, or Firm*—Senniger, Powers, Leavitt and Roedel

[57] ABSTRACT

A glassware forming machine having swinging arms carrying mold members with passages extending upwardly therethrough for flow of air for cooling said members, and first and second conduit members for delivery of air to a plenum associated with each arm, the first being oscillable on a fixed vertical axis and the second being slidably and sealably associated with the first and pivotally interconnected with a respective plenum.

2 Claims, 7 Drawing Sheets

COOLING SYSTEM FOR A GLASSWARE FORMING MACHINE

This is a continuation of application Ser. No. 010,483, filed Feb. 3, 1987, which is a continuation of application Ser. No. 859,644, filed May 5, 1986, both now abandoned.

BRIEF SUMMARY OF THE INVENTION

This invention relates to glassware forming machines, and more particularly to a cooling system for the mold members of such a machine for forming glass bottles.

The first conduit member and the pivotal interconnection between the second conduit member and its respective plenum are relatively positioned so that the movement of the carrier arms causes the pivotal interconnection to cross a line extending from the pivotal axis of the carrier arms through the pivotal axis of the first conduit. Thus, during either the opening or closing movement of the carrier arms the second conduit member reciprocates toward the first conduit member as the pivotal interconnection moves toward the line through the pivotal axis of the carrier arms and the first conduit, and the second conduit member reciprocates away from the first conduit member as the pivotal interconnection moves through and beyond the line through the pivotal axes. The motion of the carrier arms is thus accommodated by the reciprocation of the second conduit member both toward and away from the first conduit member on either the opening or closing movement of the carrier arms.

The invention is especially directed to cooling systems for the mold members of glassware forming machines of the type such as shown in U.S. Pat. Nos. 3,849,101, 4,251,253, 4,361,434, 4,388,099 and 4,561,875 wherein air is blown through passages in the mold members for cooling them, among the several objects of the invention being the provision of an improved system for delivering air to the mold members for upward flow of air through the air passages therein allowing for their swinging toward and away from one another between their open and closed positions, providing for relatively low restriction to flow of air and relatively uniform and efficient cooling of the mold members for production of glassware (especially bottles) at relatively high speed with relatively few defects, relatively low energy consumption in blowing air, and relatively low noise levels.

In general, the invention is embodied in a glassware forming machine comprising a pair of carriers each pivoted on a first generally vertical axis for swinging movement toward and away from each other between an open position and a closed position, and a plurality of mold members carried by each carrier, each mold member on each carrier being related to a mold member on the other so that, with the carriers in the closed position, each mold member on one carrier mates with a mold member on the other to define a mold cavity for molding an item of glass. Each mold member has air passages extending upwardly from the bottom thereof for passage of air therethrough for cooling. Means is provided for blowing air through said air passages comprising an plenum carried by each carrier for delivering air to the air passages of the mold members carried by the carrier, the mold members extending up from the plenum and the plenum having ports at the top thereof for flow of air up into the passages in the mold members and thence up through and out of said passages, means providing a chamber below said carriers for air to be blown into the plenums and thence up through said air passages, and means for delivery of air from said chamber means to each plenum allowing swinging of the carriers. The delivery means comprises, for each carrier, a first conduit member receiving air from said chamber means and a second conduit member receiving air from the first conduit member and delivering it to the plenum carried by the carrier. The first conduit member of each delivery means is oscillable on a fixed generally vertical axis spaced from the carrier axis and is in communication with said chamber means for delivery of air from said chamber means through said first conduit member. The second conduit member of each delivery means is slidably associated with the first conduit member for reciprocation relative to the first conduit member, with said second conduit member in slidable sealed relation with respect to the first and in communication with the first throughout the range of reciprocation of the second relative to the first. Each of the said second conduit members has a pivotal interconnection with the respective plenum on a generally vertical axis, this pivotal interconnection being formed for passage of air from the second conduit member into the plenum.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
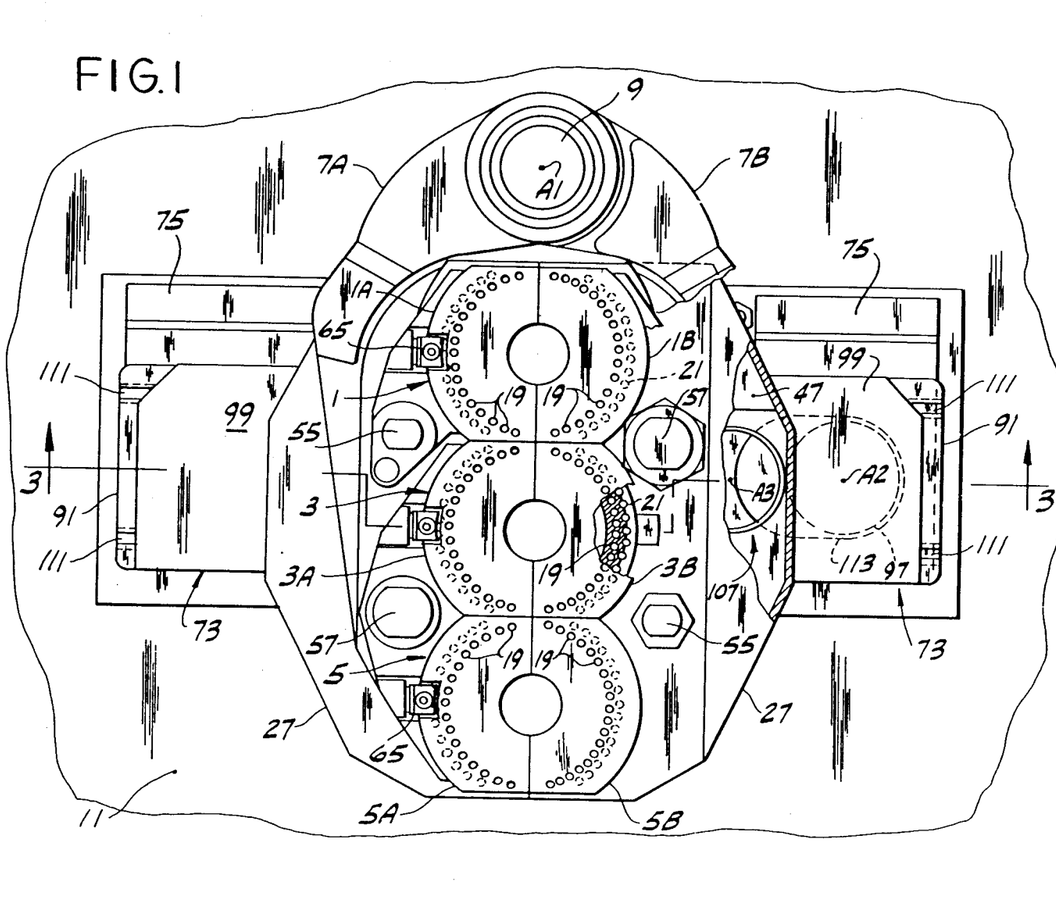
FIG. 1 is a plan, with parts broken away and shown in section, of the mold side of an individual section of a glassware forming machine in which the present invention is embodied, the mold carriers and mold members on the mold side of said section of the machine being shown in closed position.
Figure 2:
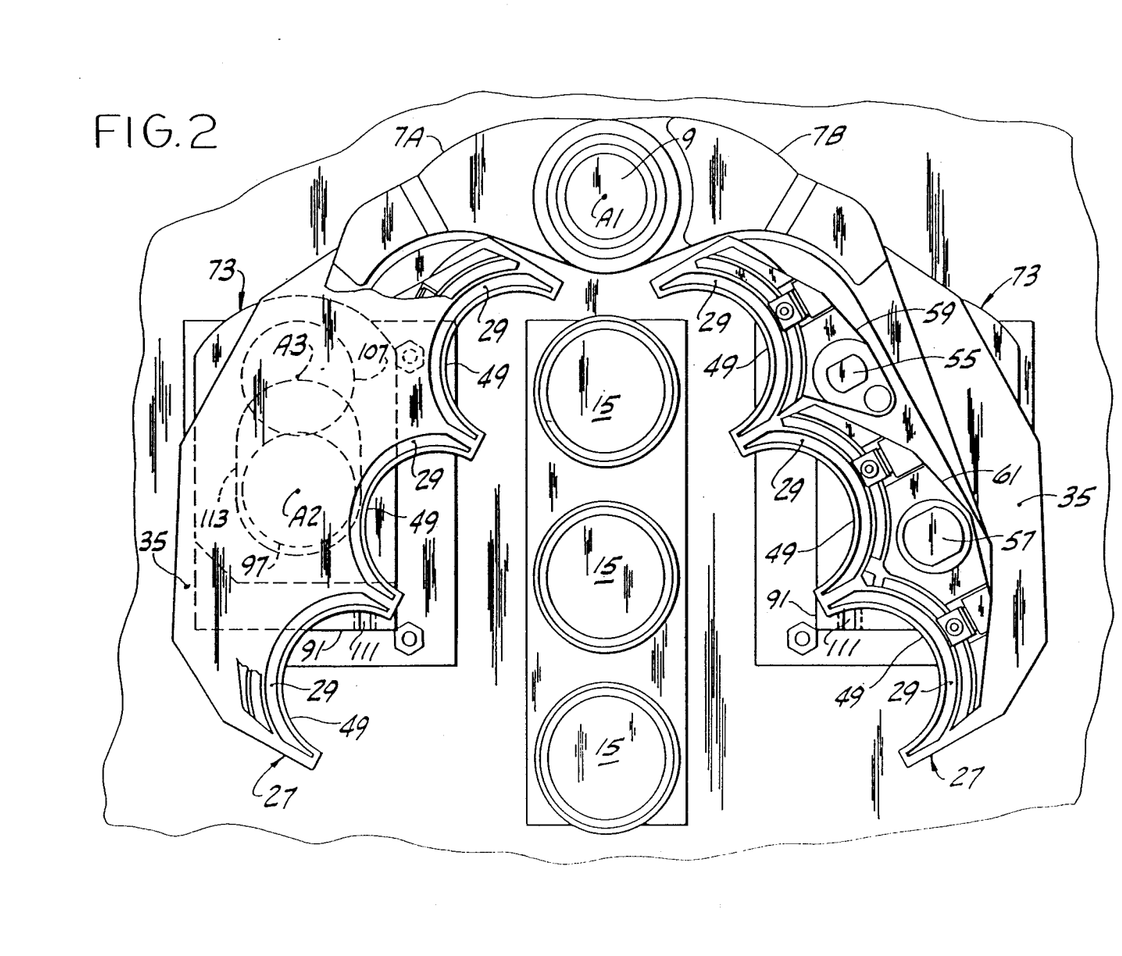
FIG. 2 is a view similar to FIG. 1 with the mold members removed showing the mold carriers in open position.

Referring to the drawings, the invention is illustrated as it is embodied on what is called the "mold side" of an individual section of a cyclically operating glassware forming machine of the individual section type, such as referred to in the above-noted U.S. Pat. No. 4,561,875, for cooling the mold members in which a parison or blank, formed on the parison or blank molding side of the section, is blown to form the final product, e.g. a bottle. It will be understood, however, that the invention may be embodied in the blank molding side of a section for cooling the blank mold members on that side. As illustrated, the stated section of the glassware forming machine is of the type referred to as a triple gob section, comprising three pairs 1, 3 and 5 of mold members for molding three bottles at a time, each member constituting a mold half. It will be understood that the invention is applicable to glassware forming machine sections other than a triple gob section, e.g. a two-gob section. The two members of the first pair are designated 1A and 1B, the two members of the second pair are designated 3A and 3B and the two members of the third pair are designated 5A and 5B. The three mold members 1A, 3A and 5A are carried by a carrier 7A and the three mold members 1B, 3B, 5B are carried by a carrier 7B, the carriers being pivoted on a first and fixed generally vertical axis indicated at A1 for swinging movement toward and away from each other between the closed position in which they are illustrated in FIG. 1, wherein mold members 1A and 1B, 3A and 3B, 5A and 5B and closed on each other for the blow molding of a blank into a bottle in each of the closed pairs of members, and the open position in which they are illustrated in FIG. 2, wherein the two mold members of each pair of mold members are spaced from each other for entry therebetween of blanks and for removal of completed bottles. The carriers 7A and 7B are pivoted on a vertical shaft 9 which extends up from the top of a base 11 of the stated individual section of the glassware forming machine, suitable mechanism well-known in the art being provided for cyclically swinging the carriers between their open and closed positions for the bottle molding process.

Figure 3:
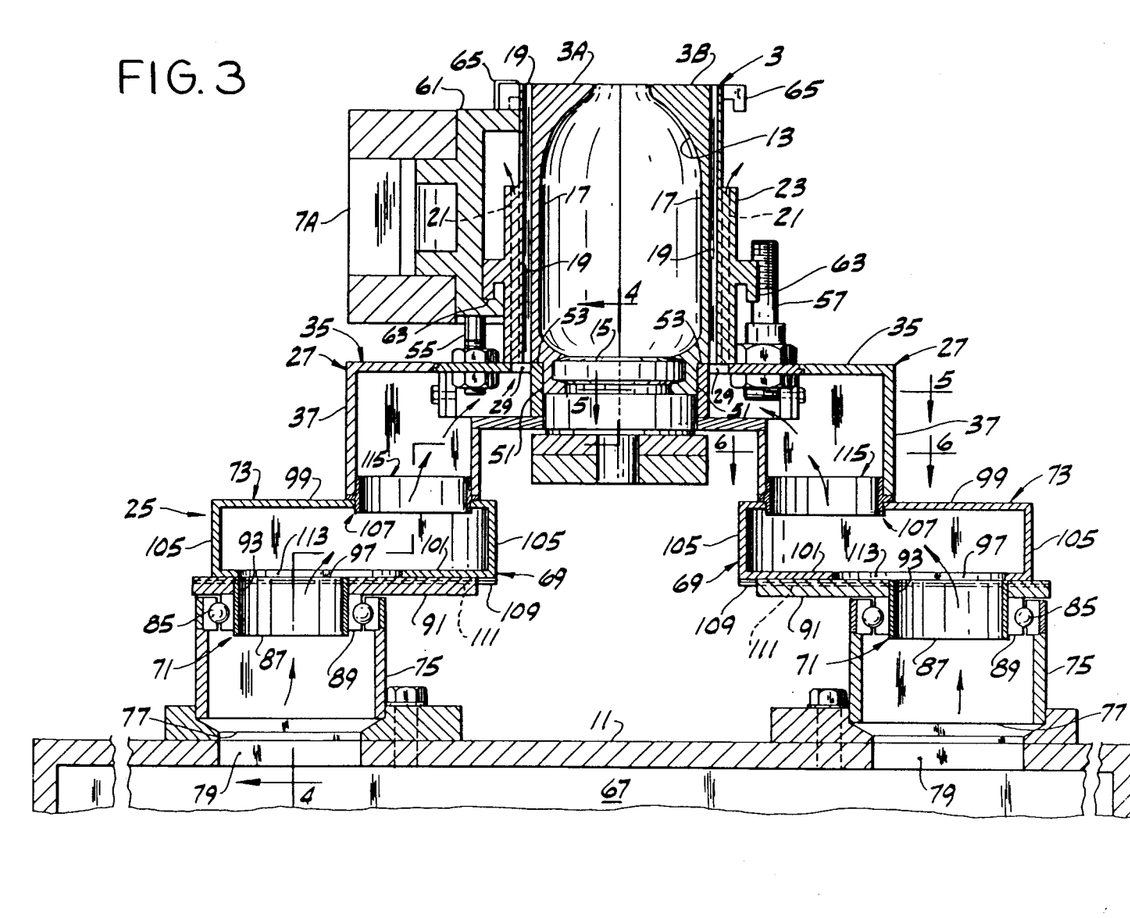
FIG. 3 is an enlarged vertical section generally on line 3—3 of FIG. 1.
Figure 4:
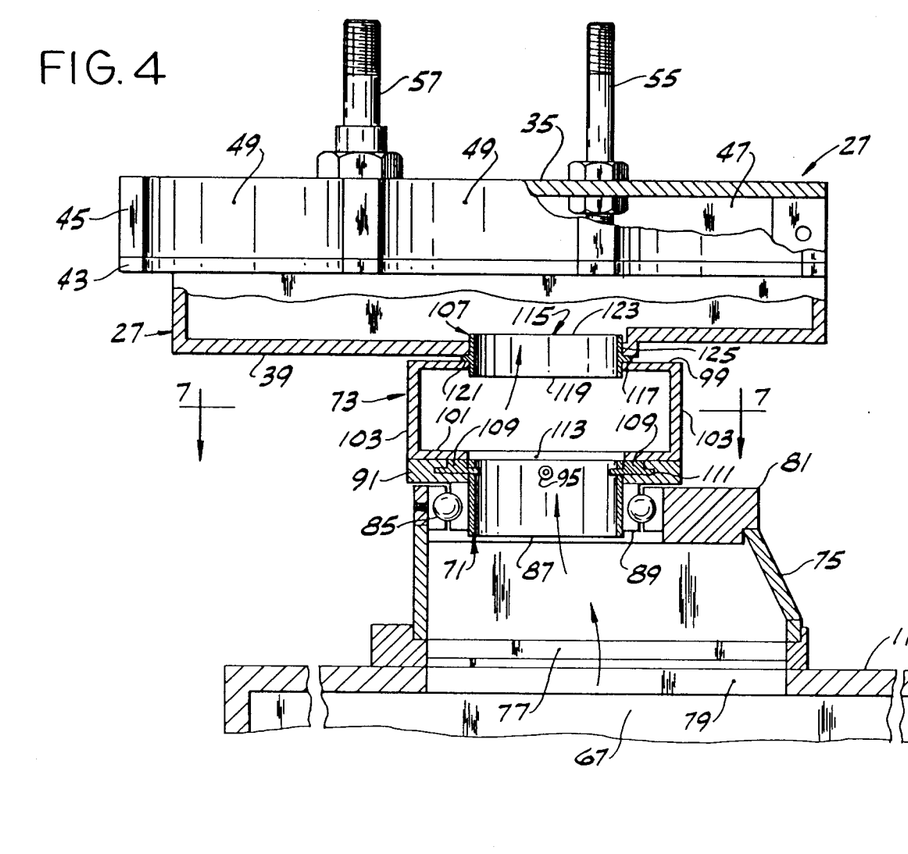
FIG. 4 is a vertical section generally on line 4—4 of FIG. 3.
Figure 5:
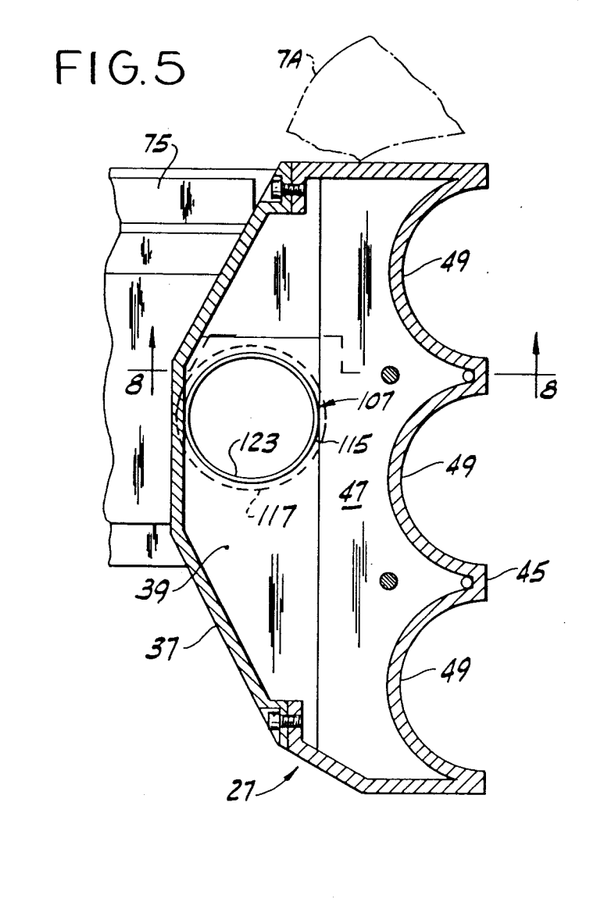
FIG. 5 is a horizontal section generally on line 5—5 of FIG. 3.
Figure 6:
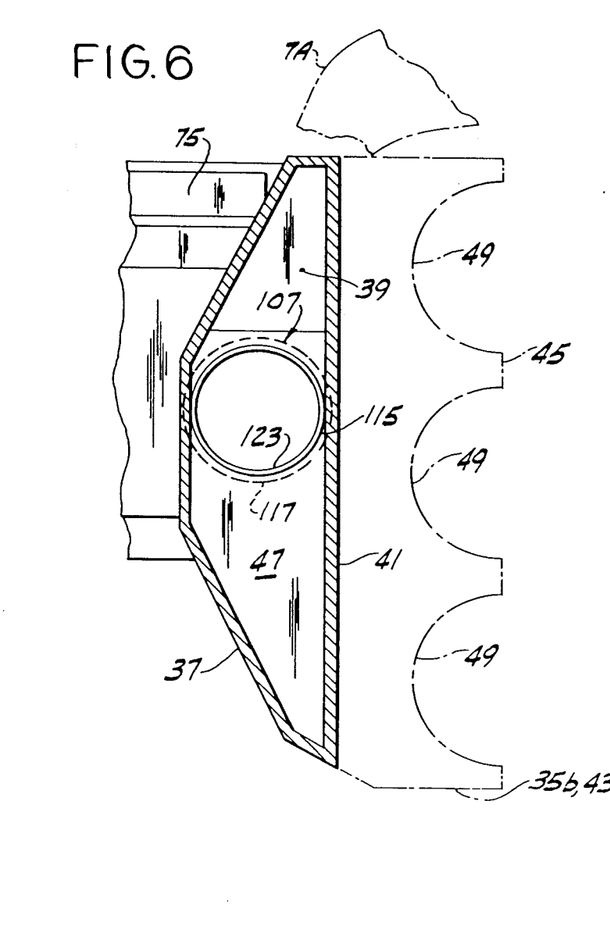
FIG. 6 is a horizontal section generally on line 6—6 of FIG. 3.

Each mold member 1A, 1B, 3A, 3B, 5A and 5B constitutes a mold half, having a cavity 13 therein which is shaped in accordance with the shape of a bottle to be formed so that, with the two mold halves brought together in closed position, the cavities of the two mold halves define the shape of the wall and the neck of the bottle. At the bottom, the two mold halves of each pair closes on a mold bottom member 15 as well known in the art. The bottom of the bottle is formed against the mold bottom member 15, and the bottle is supported on the latter when the mold halves open. Each mold half has a generally arcuate peripheral wall 17 having air passages such as indicated at 19 and 21 extending upwardly from the bottom thereof, each of these passages opening into the ambient atmosphere at its upper end for passage of air through the passages for cooling the mold half, the air exiting into the ambient atmosphere from the upper ends of the passages. Passages 19 constitute an inner group of passages extending from bottom to top of the mold half on part of an inner circle. Passages 21 constitute an outer group of passages in a enlarged-diameter lower part 23 of the mold half on part of an outer circle, these passages opening into the ambient atmosphere at the top of said lower part 23 (see FIG. 3).

Means designated 25 in its entirety is provided for blowing air through the air passages 19 and 21 in both the open and closed positions of the mold halves, comprising a plenum 27 carried by each of the carriers 7A and 7B. The mold halves 1A etc. carried on each carrier extend up from the plenum on that carrier, the plenum having ports 29 (see FIGS. 2 and 3) at the top thereof for flow of air up into the passages 19 and 21 in the mold halves on the plenum and thence up through and out of the passages. Each plenum has a relatively shallow inner section 31 and a relatively deep outer section 33, these sections having a common flat top wall 35. The deep outer section is formed by an outer portion 35a of the top wall, an outside wall 37, a bottom wall 39 and a wall 41 extending up from the inner edge of the bottom wall 39 terminating short of the top wall 35. The shallow inner section is formed by an inner portion 35b of the top wall, a wall 43 extending from the upper edge of wall 41 underneath and spaced from the inner portion 35b of the top wall and an inside wall 45 extending between the inner edge 35c of the inner portion 35b of the top wall 35 and the inner edge 43a of subjacent wall 43, the walls defining a plenum chamber 47. The inside wall 45 and the wall 43 are of scalloped formation having three scallops each designated 49, one for each of the three respective mold halves carried on the plenum. Each mold half has a reduced-diameter lower end portion 51 which fits in a respective scallop as appears in FIG. 3. At the upper end of the reduced-diameter lower end portion, each mold half has an outwardly extending downwardly facing flat horizontal shoulder portion 53 which seats on the top wall of the respective plenum around the respective scallop. The passages 19 and 21 extend upward from this shoulder, and each of the ports 29 is constituted by an arcuate slot in the top wall 35 of the plenum adjacent the respective scallop. Each mold half is removably associated in suitable manner with the respective plenum with the lower ends of the passages 19 and 21 of the mold half in register with a respective slot 29. Extending up from the top wall 35 of each plenum are studs 55 and 57 by means of which the plenum is secured to parts 59 and 61 on the respective carrier or arm 7A,m 7B. Each mold half is associated with a respective part 59, 61 as indicated 63 and 65 in FIG. 3.

As previously described, the shaft 9 on which the carriers or arms 7A, 7B are pivoted extends up from the base 11 of the stated section of the glassware forming machine, this base being formed to provide and thereby constituting means providing a chamber 67 for air to be blown into the plenums and thence up through the passages 19 and 21 in the mold halves 1A etc. both when they are in their closed position and when they are in their open position. The base with the chamber 67 therein is sometimes referred to as the "wind box" of the machine. The chamber is supplied with air by a blower (not shown) in a manner well known in the art. Means indicated generally at 69 is provided for delivery of air from the chamber to each plenum 27, this means being such as to allow swinging of the carriers 7A, 7B, and comprising for each carrier a first conduit member 71 receiving air from the chamber 67 and a second conduit member 73 receiving air from the first conduit member and delivering it to the plenum carried by that carrier.

More particularly, each delivery means 69 comprises a compartment 75, which may also be referred to as a funnel, mounted on top of the base 11 and open at its bottom as indicated at 77 for communication with chamber via an opening 79 in the top of the base. The funnel has a top plate 81 having an opening 83 therein in which is mounted a ball bearing 85, the axis of this bearing, indicated at A2, being vertical, and being spaced from the pivot axis A1 of carriers 7A and 7B as appears in FIGS. 1 and 2. The stated first conduit member 71 of each delivery means comprises a relatively short tubular member 87 which is secured in the inner race 89 of the ball bearing with its axis coincident with the fixed vertical axis A2 of the bearing, and which is thereby oscillable on axis A2. This tubular member has a head 91 on its upper end constituted by a flat relatively thick plate, this head or plate being oscillable on axis A2 in a generally horizontal plane just above the top of the funnel 75. The upper end of the tubular member 87 fits in a hole 93 in the head or plate, these parts being fastened together as indicated at 95. The tubular member 87 is in communication at its lower end with the interior of the funnel 75, the arrangement being such as to allow for delivery of air from chamber 67 up through the funnel, up through the tubular member 87, and out of the upper end 97 of the tubular member, constituting its outlet, which extends up through the hole 93 in the head or plate.

The second conduit member 73 of each delivery means 69 comprises an elongate box-like member having a top wall 99, a bottom wall 101, and a peripheral wall constituted by side walls 103 and end walls 105, member 73 being slidably associated with the first conduit member 71 for reciprocation relative to the first member 71 with the said second conduit member in slidable sealed relation throughout the range of reciprocation of the second relative to the first, and in communication with the first throughout the range of reciprocation of the second relative to the first. The second conduit member has a pivotal interconnection at 107 with the respective plenum 27 on a generally vertical axis A3, this pivotal interconnection being formed as will appear for passage of air from the second conduit member 73 into the plenum 27.

The bottom 101 of the box-like second conduit member 73 is slidable in sealed relation on the top of the head or plate 91 of the first conduit member 71, the second conduit member being guided for reciprocation lengthwise of the head or plate by means of guide members 109 of inverted T-shape on its bottom adjacent opposite sides thereof slidable in guide channels or ways 111 in the head or plate. The bottom 101 of the box-like second conduit member 73 has an elongate air inlet opening 113 (a slot) therein in communication with the outlet 97 of the first conduit member. This air inlet opening 113 is of such length and so arranged as to remain in communication with outlet 97 throughout the range of reciprocation of the box-like second conduit member 73 relative to the first conduit member 71, as will appear.

Figure 7:
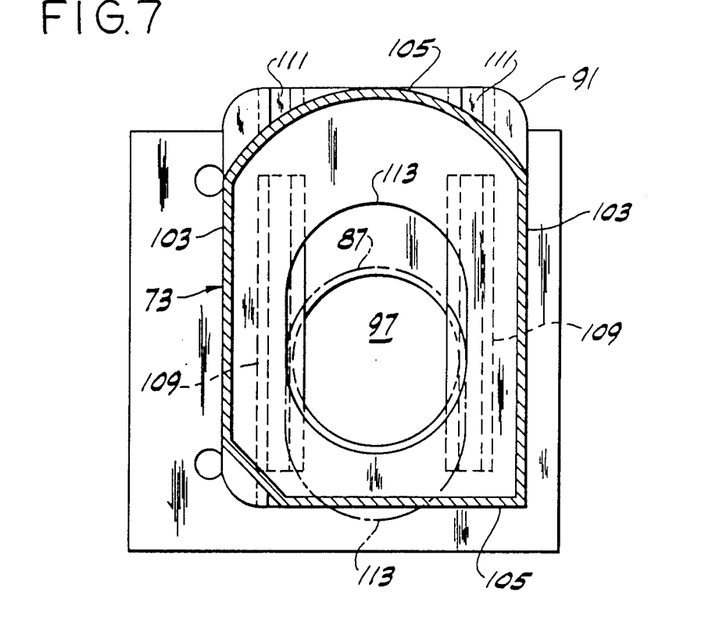
FIG. 7 is a horizontal section generally on line 7—7 of FIG. 5.
Figure 8:
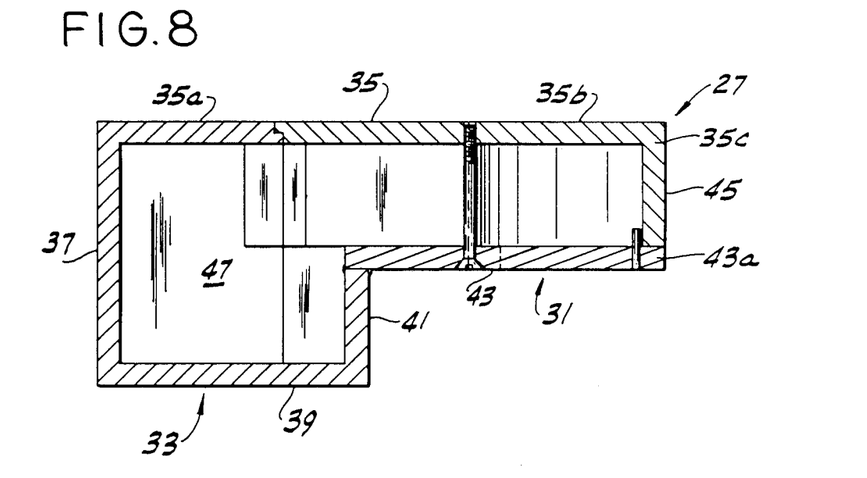
FIG. 8 is a vertical section generally on line 8—8 of FIG. 5.

When the outer end of the slot 113, as considered from the pivotal interconnection at 107, is adjacent the first conduit member 71, the second conduit member is in its outer position, (shown in solid lines in FIG. 7). When the inner end of the slot 113 is adjacent the first conduit member 71, the second conduit 15 is in its inner position (shown in phantom in FIG. 7). Thus the second conduit member 73 can be said to reciprocate inwardly and outwardly with respect to first conduit member 71.

The pivotal interconnection at 107 of each second conduit member 73 to the respective plenum 27 comprises a tubular bushing 115, e.g. a brass bushing, having an annular outwardly extending flange 117, the lower portion 119 of the bushing below the flange being fitted in an opening 121 in the top wall 99 of the member 73, the flange bearing on the top wall around the opening, and the upper portion 123 of the bushing above the flange extending up into an opening 125 in the bottom wall 39 of the plenum, the flange also engaging the bottom wall of the plenum, the arrangement providing a generally sealed pivotal air-transmitting interconnection between the top of the member 73 and the bottom of the plenum.

Figure 9:
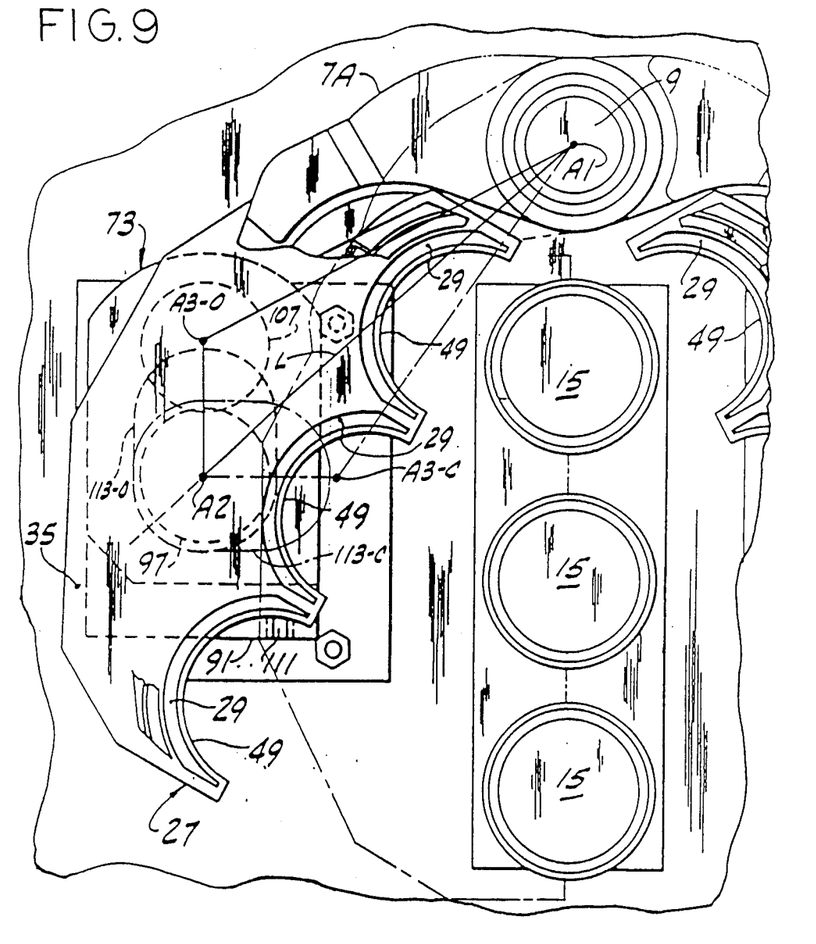
FIG. 9 is a plan similar to FIG. 1 with the carrier arms open and showing the relative positions of the first and second conduit members in phantom when the carriers are in the opened and closed position.

As noted above, in the operation of the machine, the mold-half carriers or arms 7A and 7B are cyclically swung between their open and closed positions for the bottle molding process. As each carrier swings from its closed position to its open position, the pivotal interconnection at 107 between the second conduit member 73 and the plenum 27 of each carrier swings out on an arc the radius of which is the distance from the carrier pivot axis A1 to the axis A3 of the pivotal interconnection (i.e. the axis of bushing 115). As shown in the drawings, the first conduit member 71 and the pivotal interconnection at A3 are relatively positioned so that during movement of the carriers the pivotal interconnection at A3 crosses a line L extending through the axes of the carrier arms A1 and the first conduit A2. In so doing the second conduit member reciprocates toward the first conduit member as the pivotal interconnection at A3 moves toward the line L and the second conduit member reciprocates away from the first conduit member as the pivotal interconnection at A3 moves away from the line L. Thus, the motion of the carriers swinging either open or closed is accommodated by the reciprocation of the second conduit member both toward and away from the first conduit member, rather than by reciprocation in just one direction during either the opening or closing movement of the carrier arms. By arranging the elements to utilize this double reciprocation of the second conduit member, the length of the reciprocation is reduced, thus reducing the potential for jamming and the amount of space required to accommodate the reciprocation of the second conduit. FIG. 9 shows the orientation of the slot 113 when the carriers are both open and closed. When the carriers are open, pivot axis A3 is positioned as indicated by A3-0, and the slot is oriented as indicated by 113-0. When the carriers are closed, pivot axis A3 is positioned as indicated by A3-C, and the slot is oriented as indicated by 113-C. It is apparent that during the motion of the carriers from their open to closed positions, the pivot point as starting at A3-0 passes over the line L extending through axes A1 and A2 to A3-C. As the pivot point A3 moves from A3-0 toward line L, the slot moves inwardly from its orientation at 113-0, and as the pivot point A3 moves away from line L toward A3-C, the slot moves outwardly toward its orientation at 113-C. On outward swing of this pivotal interconnection, the second conduit member 73 pivots on axis A3 and slides from the position on the head 91 such as illustrated on the right in FIG. 1 to the position on the head such as illustrated on the left in FIG. 2. As each carrier swings from its open to its closed position, the motion is reversed. The second conduit member 73 and the first conduit member 71 (comprising head 91 and tubular member 87) pivot in unison on axis A2. As the second conduit member 73 slides on the head 91, the opening or slot 113 maintains communication with outlet 97 of the first conduit member 91 and delivery of air from chamber 67 through funnel 75, and through the first conduit member 71 and the second conduit member 73 to the plenum 27 is maintained, air exiting from the plenum and flowing up through the passages 19 and 21 in the mold halves on the plenum for cooling purposes as the mold halves move in or out and while they dwell in the open or closed position.

It will be observed that effective flow of air for mold cooling is maintained from the chamber 67 through each funnel 75 and the respective first and second conduit members 71, 73 to the respective plenums 27 and thence out of ports 29 through the air passages 19 and 21 in the mold halves 1A etc. on the plenums at all times (i.e. while the carriers 7A, 7B are in the open and closed positions and while they are swinging). Full flow into the second conduit member 73 occurs throughout the range of reciprocation of the second conduit member with respect to the first conduit member 71, the elongate opening or slot 113 in the bottom of the second conduit member being of such length and its range being such in relation to the outlet at 97 of the first conduit member that the flow out of the first conduit member into the second is unimpeded. Also, the flow to each plenum 27 involves only two changes of direction, namely, from vertical to horizontal in passing from the first to the second conduit member and from horizontal to vertical in passing from the second conduit member into the plenum.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A glass ware forming machine comprising:
   a pair of carriers each pivoted on a first generally vertical axis for swinging movement toward and away from each other between an open and a closed position,
   a plurality of mold members carried by each carrier, each mold member on each carrier being related to a mold member on the other so that, with the carriers in their said closed position, each mold member on one carrier mates with a mold member on the other to define a mold cavity for molding an item of glass,
   each mold member having air passages extending upwardly from the bottom thereof for passsage of air therethrough for cooling,
   a plenum carried by each carrier for delivering air to the air passages of the mold members,
   a chamber, below said carriers, for air to be blown into the plenums and thence up through said air passages,
   means for delivery of air from said chamber to each plenum allowing swinging of the carrier comprising: for each carrier:
   a first conduit member in communication with said chamber for delivery of air from said chamber through said first conduit member, the first conduit member being oscillable on a fixed generally vertical axis spaced from the carrier axis, and
   a second conduit member in slidable sealed relation with the first conduit member for reciprocation relative to the first conduit member and in communication with the first throughout the range of reciprocation of the second relative to the first, said second conduit member being pivotally interconnected with the respective plenum on a generally vertical axis, said pivotal interconnection being formed for passage of air from the second conduit member into the plenum,
   the fixed generally vertical axis about which the first conduit member oscillates with respect to the chamber and the pivotal interconnection between the second conduit member and the plenum being relatively positioned so that as the carrier arms swing toward and away from each other between their said open and a closed position, the pivotal interconnection between the second conduit and the plenum crosses a line extending through the fixed generally vertical axis about which the first conduit member oscillates with respect to the chamber and the fixed axis about which the carrier arms pivot.

2. A glass ware forming machine comprising:
   a pair of carriers each pivoted on a first generally vertical axis for swinging movement toward and away from each other between an open and a closed position,
   a plurality of mold members carried by each carrier, each mold member on each carrier being related to a mold member on the other so that, with the carriers in their said closed position, each mold member on one carrier mates with a mold member on the other to define a mold cavity for molding an item of glass,
   each mold member having air passages extending upwardly from the bottom thereof for passages of air therethrough for cooling,
   a plenum carried by each carrier for delivering air to the air passages of the mold members,
   a chamber below said carriers for air to be blown into the plenums and thence up through said air passages,
   means for delivery of air from said chamber means to each plenum allowing swinging of the carrier comprising, for each carrier, a first conduit member receiving air from said chamber means and a second conduit member receiving air from the first conduit member and delivering it to the plenum carried by the carrier,
   the first carrier member of each delivery means being oscillable on a fixed generally vertical axis spaced from the carrier axis and being in communication with said chamber for delivery of air from said chamber through said first conduit member,
   the second conduit member of each delivery means being slidably associated with the first conduit member for reciprocation toward and away from the first conduit member with said second conduit member in slidable sealed relation with respect to the first conduit member and in communication with the first conduit member throughout the range of reciprocation of the second relative to the first,
   said second conduit member having a pivotal interconnection with the respective plenum on a generally vertical axis, said pivotal interconnection being formed for passage of air from the second conduit member into the plenum,
   the fixed axis of the first conduit member and the pivotal interconnection between the second conduit member and the plenum being positioned relative to each other so that as the carriers swing toward and away from each other between their said open and a closed positions, the pivotal interconnection passes over a line that extends through the fixed axis of the first conduit and the fixed axis of the carriers, the second conduit sliding in one direction with respect to the first carrier as the pivotal interconnection approaches the line, and in the opposite direction as the pivotal interconnection moves away from the line.

* * * * *